(12) United States Patent
Hartman

(10) Patent No.: US 11,113,138 B2
(45) Date of Patent: Sep. 7, 2021

(54) SYSTEM AND METHOD FOR ANALYZING AND RESPONDING TO ERRORS WITHIN A LOG FILE

(71) Applicant: Carrier Corporation, Palm Beach Gardens, FL (US)

(72) Inventor: Eric Hartman, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 244 days.

(21) Appl. No.: 16/235,072

(22) Filed: Dec. 28, 2018

(65) Prior Publication Data
US 2019/0205197 A1 Jul. 4, 2019

Related U.S. Application Data

(60) Provisional application No. 62/612,797, filed on Jan. 2, 2018.

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0778* (2013.01); *G06F 11/0793* (2013.01)

(58) Field of Classification Search
CPC ............... G06F 11/079; G06F 11/0751; G06F 11/0778; G06F 11/0793; G06F 11/0766; G06F 11/0769; G06F 11/0775; G06F 11/22; G06F 11/2268; G06F 11/3065; G06F 11/3068; G06F 11/3072; G06F 11/3082; G06F 11/323; G06F 11/324; G06F 11/3476

See application file for complete search history.

(56) References Cited

U.S. PATENT DOCUMENTS

| | | | |
|---|---|---|---|
| 5,847,972 A | 12/1998 | Eick et al. | |
| 7,076,508 B2 | 7/2006 | Bourbonnais et al. | |
| 7,506,195 B2 * | 3/2009 | Takahashi | G06F 11/079 714/4.4 |
| 7,600,671 B2 | 10/2009 | Forrest et al. | |

(Continued)

FOREIGN PATENT DOCUMENTS

| | | |
|---|---|---|
| CN | 104951529 | 6/2015 |
| CN | 106095864 | 6/2016 |

(Continued)

OTHER PUBLICATIONS

Samii, Armin and Woojong Koh, Interactive Visualization for System Log Analysis, 2013, University of California, Berkeley, pp. 1-7.

(Continued)

*Primary Examiner* — Anthony J Amoroso
(74) *Attorney, Agent, or Firm* — Carlson, Gaskey & Olds, P.C.

(57) ABSTRACT

An exemplary method for analyzing an error log file includes receiving an error log file at a processor, the error log file including a plurality of distinct entries, determining a token pattern of each entry by tokenizing each of the distinct entries, and grouping the plurality of distinct entries into groups having similar token patterns.

17 Claims, 2 Drawing Sheets

(56) References Cited

U.S. PATENT DOCUMENTS

| | | | |
|---|---|---|---|
| 7,698,305 | B2 | 4/2010 | Verbowski et al. |
| 7,739,230 | B2 | 6/2010 | Bourne et al. |
| 8,499,240 | B2 | 7/2013 | Richstein |
| 8,732,199 | B2 | 5/2014 | Chen et al. |
| 9,311,221 | B2 | 4/2016 | Wood et al. |
| 9,516,044 | B2 * | 12/2016 | Lietz ............... H04L 63/145 |
| 9,519,698 | B1 | 12/2016 | Lee et al. |
| 9,679,125 | B2 | 6/2017 | Bailor et al. |
| 9,710,857 | B2 | 7/2017 | Flegel et al. |
| 2003/0009514 | A1 | 1/2003 | Kasvand et al. |
| 2009/0144699 | A1 | 6/2009 | Fendt et al. |
| 2011/0154117 | A1 | 6/2011 | Danielson et al. |
| 2012/0054675 | A1 | 3/2012 | Rajamannar et al. |
| 2012/0245925 | A1 * | 9/2012 | Guha ............... G06F 40/237 704/9 |
| 2014/0149924 | A1 | 5/2014 | Sharp et al. |
| 2014/0366006 | A1 | 12/2014 | Gottschlich et al. |
| 2015/0242431 | A1 | 8/2015 | Vlcek |
| 2016/0103881 | A1 | 4/2016 | Gukal |
| 2016/0342656 | A1 | 11/2016 | Dubost et al. |
| 2016/0344834 | A1 | 11/2016 | Das |
| 2017/0004188 | A1 | 1/2017 | Gupta |
| 2017/0011101 | A1 | 1/2017 | Venkatesan et al. |
| 2018/0052918 | A1 * | 2/2018 | Gu ............... G06F 16/35 |
| 2018/0165147 | A1 * | 6/2018 | Debnath ............ G06F 11/0766 |

FOREIGN PATENT DOCUMENTS

| | | |
|---|---|---|
| CN | 106815089 | 12/2016 |
| CN | 107256219 | 4/2017 |

OTHER PUBLICATIONS

Hochheiser, Harry and Ben Shneiderman, Using Interactive Visualizations of WWW Log Data to Tharacterize Access Patterns and Inform Site Design, 2001, Journal of the Association for Information Science and Technology, vol. 52, Issue 4, pp. 331-343.

* cited by examiner

SYSTEM AND METHOD FOR ANALYZING AND RESPONDING TO ERRORS WITHIN A LOG FILE

TECHNICAL FIELD

The present disclosure relates generally to a system for identifying and automatically responding to errors, and specifically to a system and method for identifying errors within an error log file, and automatically responding to the identified errors.

BACKGROUND

Modern software applications, as well as computer controlled industrial processes and similar systems, frequently generate troubleshooting information and error messages that are stored in a sequential log file referred to as an error log. Each entry in the log file is typically a single line of characters and can include dates, times, information about the error, alphanumeric error codes, text, and any other information that the creators of the computer program or controller deemed pertinent.

However, even within individual industries and applications, there is no standardized presentation of error information within a line of the log file, and there is no standardized format for recording the information into the log files. Instead, each software application and controller has its own specific style of recording the error information. The recording of that error information can include dates and times in any number of formats, omit dates and times entirely, and in some cases may not be formatted at all beyond the line delineation separating distinct log entries.

In addition to the lack of standardized formatting, log files can quickly become excessively large and contain multiple entries having redundant or unnecessary information. The presence of extremely large numbers of log entries, and the lack of standard formatting, can make it difficult or impossible for a user to determine the cause of any given error within a reasonable amount of time resulting in excessively high analysis costs. In some situations the process or program outputting the error must remain shut down for a duration of the analysis, further compounding the cost associated with excessively large, unformatted, log files.

SUMMARY OF THE INVENTION

An exemplary method for analyzing an error log file includes receiving an error log file at a processor, the error log file including a plurality of distinct entries, determining a token pattern of each entry by tokenizing each of the distinct entries, and grouping the plurality of distinct entries into groups having similar token patterns.

An exemplary system for implementing the method includes a controller having a processor and a memory, the controller operating at least one software program and being configured to write error messages to an error log file stored in the memory, a computer including a log analyzer module, the computer being configured to receive the error log file from the controller, and wherein the log analyzer module includes a pattern detection module configured to detect patterns in tokenized log file entries, a coverage map module configured to visually display an output of the pattern detection module, and an interactive log analysis module configured to allow a user to manually add or remove portions of the error log file received at the computer, and an output of the computer configured to pass instructions to the processor in response to the pattern detection module identifying a known pattern, the instructions being operable to cause the processor to implement an error resolution.

These and other features of the present invention can be best understood from the following specification and drawings, the following of which is a brief description.

Following is a detailed description of each of the included Figures.

DETAILED DESCRIPTION

Figure 1:
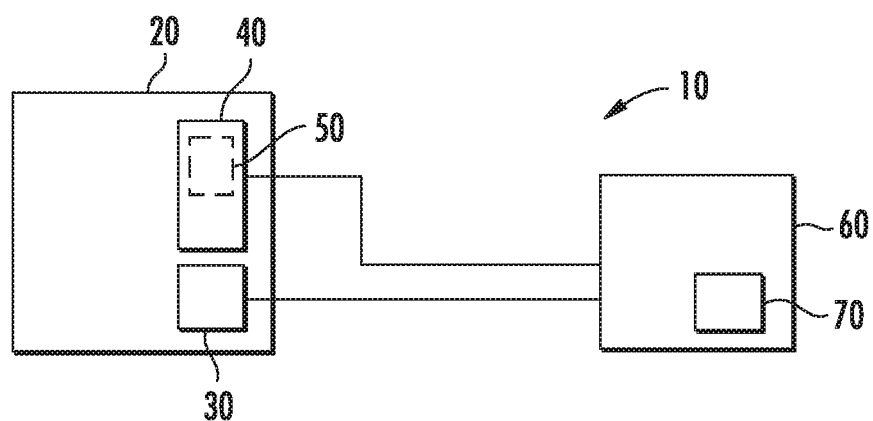
FIG. 1 illustrates an exemplary control system including an error log.

FIG. 1 schematically illustrates a control system 10 including a controller 20 having a processor 30 and a memory 40. The controller 20 can be a unique process controller for a manufacturing process, a general computer, or any other computerized system that operates a computer program. During operation of the controller 20 errors encountered by the processor 30 are written to an error log 50, which is stored within the memory 40. The error log 50 is a sequence of text entries, with each entry being delineated by a line break.

A second computer 60 is connected to the controller 20 and is configured to read the error log 50. In some examples, the controller 20 and the second computer 60 can be a single integrated computerized device, such as a Computer-Aided-Design (CAD) workstation, a computer controlled additive manufacturing machine, or any other computerized system or program.

Contained within the second computer 60 is an error log analyzer 70. The error log analyzer 70 is a format agnostic tool that is capable of analyzing and distilling error logs 50 provided in any error format from a single source. The error log analyzer 70 can output the analyzed error log 50 to a user, via a log file analysis display (illustrated in FIG. 3). In further examples, the error log analyzer 70, or the second computer 60 can automatically output a corrective action, or a corrective response, to the processor 30 in response to the error log analyzer 70 identifying a predefined error having a known solution within the error log 50. Once the corrective action or response has been received by the controller 20, the processor 30 causes the corrective response to be implemented within the controller 20.

By way of example, if the second computer 60 has identified a specific error log pattern as being able to be corrected by a corresponding software update, the corrective action can cause the controller 20 to automatically retrieve and implement the software update, thereby correcting the error without requiring further human intervention.

Figure 2:
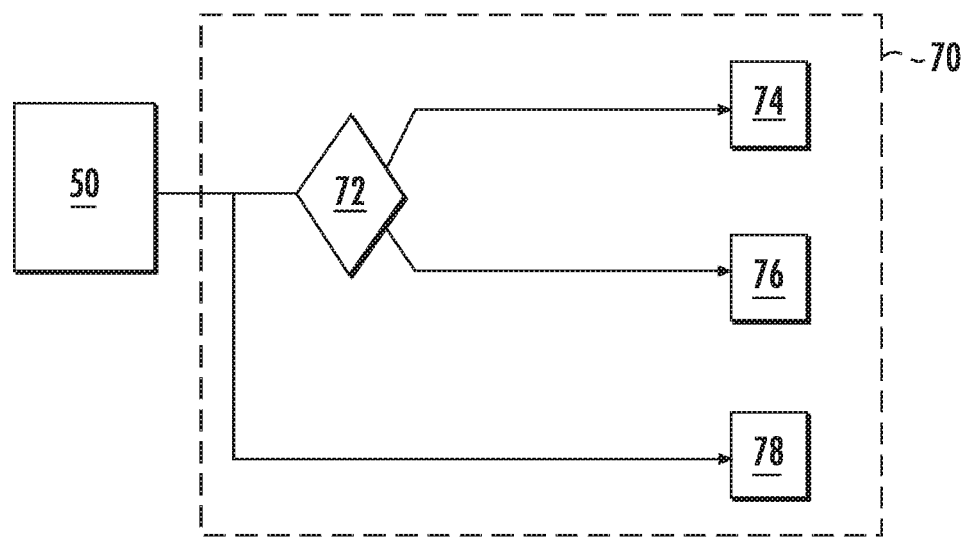
FIG. 2 schematically illustrates an exemplary log file analysis tool for automatically identifying unique errors within a log file.

With continued reference to FIG. 1, and with like numerals indicating like elements, FIG. 2 illustrates a process performed by the error log analyzer 70. Initially the error log analyzer 70 receives the error log 50 from the controller 20, and provides the error log 50 to a pattern discovery algorithm 72. The pattern discovery algorithm 72 uses a tokenization process, described herein, to identify patterns within the error log 50. Once the patterns have been identified, the patterns are output to a patterns and statistics module 74 which statistically analyzes the patterns to determine a frequency of occurrence of any given error pattern, a similarity of the errors within a given error pattern or sub-pattern, or any similar statistical data about the patterns.

Simultaneous with the patterns and statistics module 74, the output of the pattern discovery algorithm 72 is provided to a coverage map module 76. The coverage map module 76 generates a visual representation of the patterns identified by the pattern discovery algorithm 72 within the error log 50, thereby aiding a user in reviewing the error log 50 in cases where an automatic corrective action is not defined, or is not utilized. In addition, an interactive filtering view 78 is generated. The interactive filtering view 78 provides an interface, by which the user can interact with the error log 50. The interaction can include limiting the data analyzed, selecting error segments to be analyzed, and the like.

With regards to the pattern discovery algorithm 72, the tokenization process accepts each error log entry, delineated by line breaks, as a new input and converts the alphanumeric, punctuation, and whitespace characters into corresponding tokens. Each token represents all sequential characters of the token type. By way of example, an entry log reading "2016/05/12" would be tokenized as a sequence of an alphanumeric token, a punctuation token, an alphanumeric token, a punctuation token, and an alphanumeric token, in that order. The system does not distinguish tokens of a given type from other tokens of that token type, regardless of the specific values and quantities of the symbols represented by the token.

In some cases, additional tokenization can be used beyond the alphanumeric, punctuation, and space tokenization described above. By way of example, the pattern discovery algorithm 72 can set discrete tokens for known or anticipated formats of information. Again referencing the exemplary "2016/05/12" error log entry, the standardized date format of Year/Month/Day can be a single designated date token, and can be represented by a single token, instead of the five tokens listed above. Additional exemplary tokens that could be utilized are hexadecimal numbers, weekday, months, stack trace lines, timestamps, and the like.

In some examples, the tokenization process within the pattern discovery algorithm 72 can include known token patterns stored in a corresponding memory. The known token patterns are sequences of tokens with a preprogrammed corrective action, or sequences of tokens that have been added over time by a user with a corresponding defined corrective action. In either case, when a recognized error pattern is encountered, the pattern discovery algorithm 72 can cause the second computer 60 to communicate the corrective action to the controller 20 and automatically implement the corrective action.

Once each entry in the error log 50 is converted into a tokenized entry, a comparison is run to determine how frequently any given pattern of tokens appears using the patterns and statistics module 74. The patterns and statistics module 74 searches for similarly formatted errors by matching patterns of tokens, even if the corresponding errors contain variations within the actual error entry. By way of example, if a given error type is output to the error log as "Error 123: [date]/[time] 'Exception occurred'" then the tokenized entry could be the following token sequence: alphanumeric, punctuation, date, punctuation, timestamp, punctuation, alphanumeric. The patterns and statistics module 74 can then determine how many other entries within the error log 50 conform to the specified token pattern, even if those other entries include different specific values for the date, timestamp, and exception language.

By tokenizing the data within each error log entry, and analyzing the tokens for token patterns, specific formatting of any given error log is not required for proper analysis. This is referred to as the pattern discovery algorithm 72 being format agnostic. Further, tokenizing the error messages can reduce an error log entry from millions of error entries to 30-50 error entry patterns. The frequency of any given error entry pattern is determined by comparing the error pattern of each entry against each other entry and counting the number of times the error pattern is repeated. Any similar statistic or counting can be performed as well to determine relevant or desired statistics according to known comparison methods.

Figure 3:
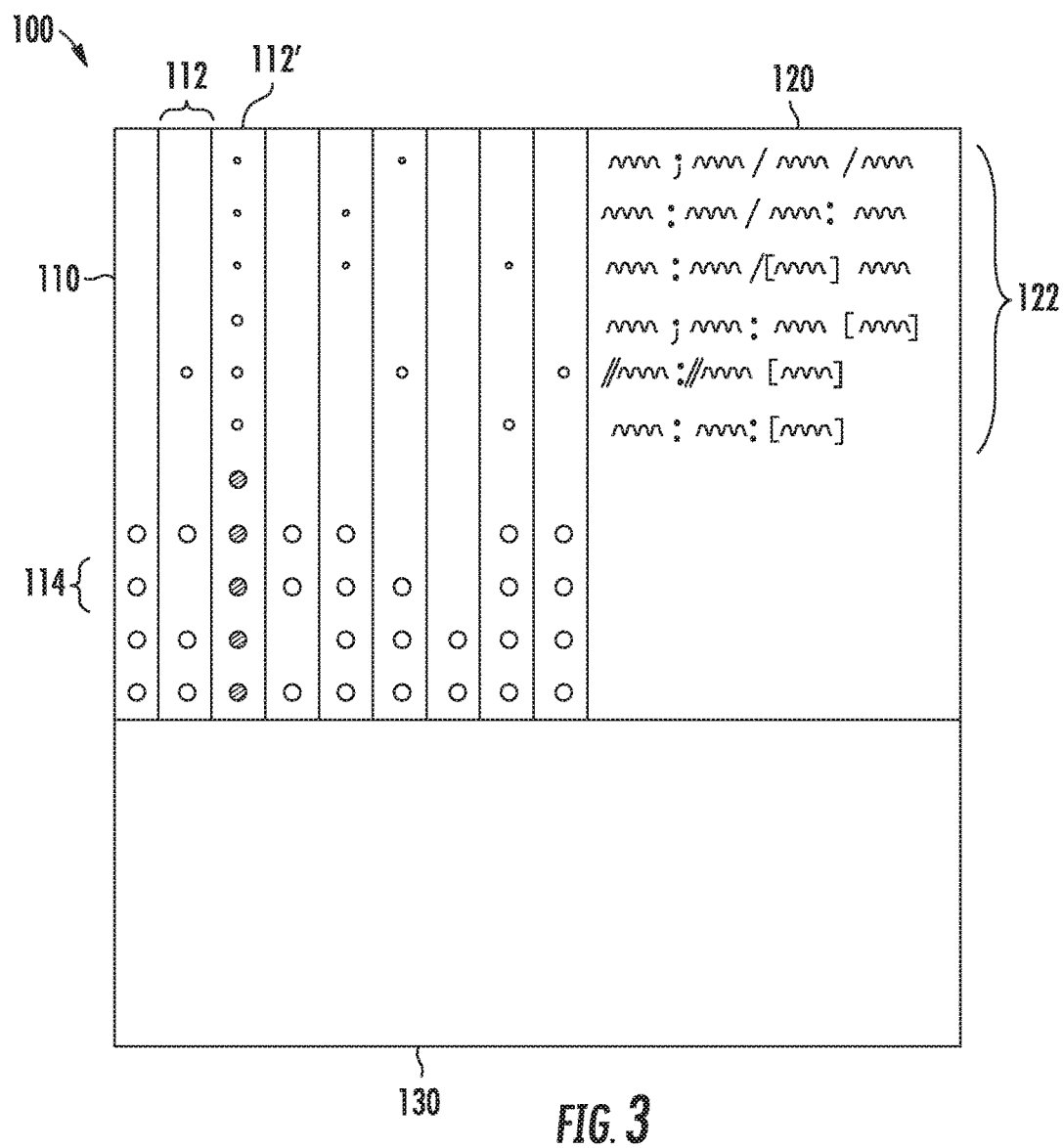
FIG. 3 illustrates an exemplary user output display of analyzed log file data.

With continued reference to FIGS. 1 and 2, FIG. 3 illustrates an exemplary user output display 100 including a coverage map 110 generated by the coverage map module 76, a pattern discovery pane 120 displaying pattern discovery operations of the computer 60, and an interactive log analysis pane 130 allowing the user to interact with and adjust the pattern analysis, and the log entries. While illustrated in a particular layout in FIG. 3, it is appreciated that the coverage map 110, the discovery pane 120, and the interactive log analysis 130 may be displayed in any configuration including distinct windows, overlapping tabs within a window, and the like.

The pattern discovery pane 120 illustrates an exemplary set of error log entries 122, as the pattern discovery algorithm 72 analyzes it. The pattern discovery pane 120 can include graphical cues, such as color, underlining, shading, highlighting and the like, to indicate specific sub-patterns, or individual tokens, within a given log entry and allow a user to more quickly identify the relevant information or relevant distinctions within that entry or pattern. Further, the interactive log analysis 130 allows a user to select, or deselect, segments of the error log to be analyzed by the error log analyzer 70. The selection or deselection is, in one example, based on pattern and the user is capable of selecting or deselecting all error log entries matching a given pattern, or containing a given pattern. Once selected or deselected, the user can then adjust what error log entries are being analyzed. Further, any other determinable information point can be used to identify error log entries to be analyzed, including timestamp, date, or any similar data point.

The exemplary coverage map 110 includes a set of columns 112 and rows 114. Each row 114 is representative of a log entry pattern made up of a unique sequence of tokens from the tokenization process described above. In some examples, a frequency column can be positioned with an entry adjacent to each row indicating the frequency that the unique pattern of tokens within that row 114 occurred in the entire error log 50. Each column 112 represents a segment (or subset) of the overall error log in sequential order. The contents of the intersection of each column 112 with each row 114 indicate the existence of the unique pattern of tokens within row 114 occurred in that relevant segment (or subset) of the error log 50. In some examples, the size of the indicator in a given column 112/row 114 can be further indicative of the frequency of that particular intersection of the column 112/row 114.

In some examples, each of the log entries within a segment (or subset) of the error log 50 represented by a given column 112, can be analyzed and compared against each of the other segments (or subsets) of the error log 50 represented by all other column 112 to determine the amount of variation within each column 112 across all log error patterns for every row 114. The coverage map 110 can highlight a column 112 that includes the most variation in error patterns across all rows 114. The highlighting can be via shading, coloration, or any similar highlighting effect. Similarly, the column 112 that includes the least variation in error pattern across all rows 114 can be highlighted to differentiate between high and low variation.

Figure 4:
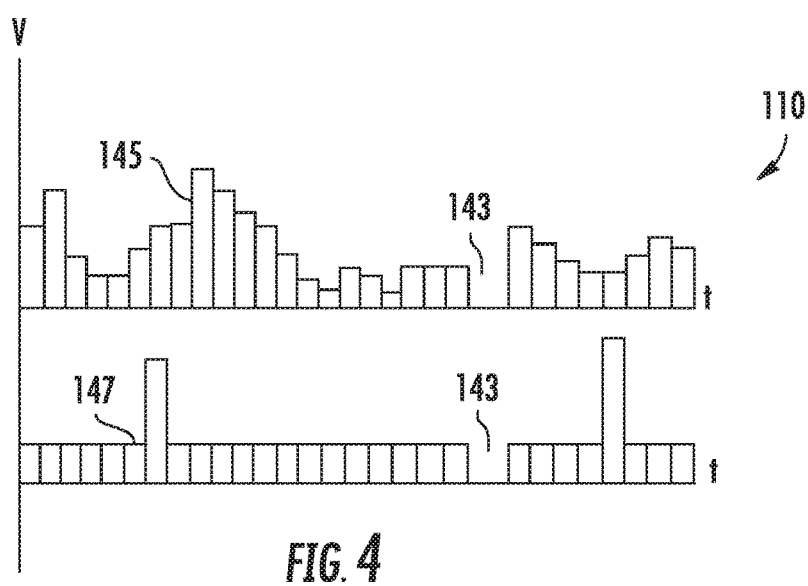
FIG. 4 schematically illustrates a timeline graph of two exemplary error patterns within an error log file.

In addition to the coverage map 110, a timeline graph 140, illustrated in FIG. 4, can be generated by the coverage map module 76, when a recognizable time or date pattern is identified within the subset of patterns in each error log entry. The exemplary timeline graph 140 indicates the frequency of occurrence of two exemplary error patterns 145, 147 over time (along the t axis) and the variation of the error patterns 145, 147 over time (along the v axis). The error log has a gap 143 that occurs in the middle where no instances of a pattern occurred. Generating a timeline graph 140 can allow a user to visually see the occurrence of any, or all, sub patterns and easily identify spikes, or gaps, within a given error pattern. When the timestamp, or date, of the error patterns is known, the spikes or gaps can be correlated with real world events, which can further aid the user in identifying specific errors or error patterns, and determining the appropriate corrective action. In alternative examples, the timeline graph 140 can illustrate the variation within a given pattern over time, in addition to, or instead of, the frequency of the sub-pattern over time.

With reference to all of FIGS. 1-4, the integrated pattern discovery, coverage map and interactive analysis significantly reduces the required user troubleshooting time related to the analysis of software application log files and enables the user to more quickly find unique errors and the root cause of any given field issue by allowing for a quick and visual representation of unique, or infrequent errors. This visual representation enables the users to differentiate the common errors, which may be ignored, from consequential errors that need to be addressed. Further, in many applications, pouring through the error log is not practical without a tool, such as the error log analyzer 70 discussed above, as the volume of errors in the error log can number in the millions or more.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for analyzing an error log file comprising:
receiving an error log file at a processor, the error log file including a plurality of distinct entries;
determining a token pattern of each entry by tokenizing each of the distinct entries, wherein tokenizing each of the distinct entries comprises converting each series of sequential alphanumeric characters in each error log entry into an alphanumeric token, converting each series of sequential punctuation characters in each error log entry into a punctuation token, and each series of spaces in each error log entry into a space token;
further comprising converting known sub-patterns of tokens in each tokenized entry into a corresponding secondary token and
grouping the plurality of distinct entries into groups having similar token patterns.

2. The method of claim 1, wherein determining the token pattern of each entry further comprises comparing the token pattern against a set of token patterns having known resolutions.

3. The method of claim 2, further comprising causing said processor to automatically implement the known resolution in response to the token pattern of an error log entry matching a token pattern having a known resolution.

4. The method of claim 3, wherein the known resolution includes implementing a software update.

5. The method of claim 1, wherein the known sub-patterns of tokens include at least one of date sub-patterns, timestamp sub-patterns, hexadecimal number sub-patterns, weekday sub-patterns, month sub-patterns, and stack trace line sub-patterns.

6. The method of claim 1, further comprising generating a visual error log coverage map, the visual error log coverage map segregating tokenized entries into groups of matching token patterns, and displaying each token pattern once.

7. The method of claim 6, wherein the displayed token pattern further includes an indicator corresponding to a frequency of that token pattern occurring across all the entries.

8. The method of claim 7, wherein the indicator is a number representing a number of entries having the token pattern.

9. The method of claim 7, further comprising displaying each sub-pattern that occurs within each token pattern, and correlating the patterns thereby determining and displaying a number of token patterns including each sub-pattern.

10. The method of claim 7, further comprising determining an overall token pattern variation within a segment of the error log, and identifying the segment of the error log having a least amount of variation via a visual designation.

11. The method of claim 10, further comprising identifying the segment having the most variation via a second visual designation.

12. The method of claim 1, further comprising removing a subset of entries in the error log file in response to a user selecting the subset of entries via an interactive filtering view.

13. The method of claim 1, further comprising dividing the error log into a plurality of segments, wherein each segment in said plurality of segments includes a corresponding error pattern.

14. A method for analyzing an error log file comprising:
receiving an error log file at a processor, the error log file including a plurality of distinct entries;
dividing the error log into a plurality of segments, wherein each segment in said plurality of segments includes a corresponding error pattern;
determining a token pattern of each entry by tokenizing each of the distinct entries;
grouping the plurality of distinct entries into groups having similar token patterns; and
visually indicating a matching error pattern across the plurality of segments, wherein a size of the visual indication is increased proportional to the frequency of an occurrence of the error pattern.

15. A system for analyzing error logs comprising:
a controller including a processor and a memory, the controller operating at least one software program and being configured to write error messages to an error log file stored in the memory;
a computer including a log analyzer module, the computer being configured to receive the error log file from the controller, the error log file including a plurality of distinct entries, and wherein the log analyzer module includes a pattern detection module configured to tokenize each of the distinct entries by at least converting each series of sequential alphanumeric characters in each error log entry into an alphanumeric token, converting each series of sequential punctuation characters in each error log entry into a punctuation token, and each series of spaces in each error log entry into a space token and to detect patterns in tokenized log file entries, and configured to group the plurality of distinct entries into groups having similar token patterns, a coverage map module configured to visually display an output of the pattern detection module, wherein the visual display of the output includes visually indicating a matching error pattern across the plurality of segments, wherein a size of the visual indication is increased proportional to the frequency of an occurrence of the error pattern, and an interactive log analysis module configured to allow a user to manually add or remove portions of the error log file received at the computer; and an output of the computer configured to pass instructions to the processor in response to the pattern detection module identifying a known pattern, the instructions being operable to cause the processor to implement an error resolution.

16. The system of claim 15, wherein the error resolution is a software patch.

17. The system of claim 15, wherein the computer and the controller are a single computerized device.

* * * * *